United States Patent [19]

Mitchell

[11] 4,114,543
[45] Sep. 19, 1978

[54] SEED PLANTING DEVICE WITH AUTOMATIC SEED COVERING

[76] Inventor: Roderick A. Mitchell, 5042 N. Winthrop, Chicago, Ill. 60640

[21] Appl. No.: 702,241

[22] Filed: Jul. 2, 1976

[51] Int. Cl.² .......................... A01C 5/02; A01C 7/02
[52] U.S. Cl. ........................................ 111/96; 111/99; 172/22
[58] Field of Search ............................. 111/89, 92–99; 172/22; 294/50.7; 124/37, 39

[56] References Cited

U.S. PATENT DOCUMENTS

| | | | |
|---|---|---|---|
| 12,465 | 2/1855 | Barnhart | 111/95 |
| 13,419 | 8/1855 | Barnhart | 111/95 |
| 55,399 | 6/1866 | Wakefield | 111/96 |
| 257,820 | 5/1882 | Horton | 111/95 |
| 265,414 | 10/1882 | Hoag | 111/96 |
| 1,076,125 | 10/1913 | Kilgore | 124/37 X |
| 1,172,191 | 2/1916 | Beverly | 111/96 |
| 2,103,710 | 12/1937 | Carner | 111/95 X |
| 2,531,297 | 11/1950 | Rose | 294/50.7 |
| 3,695,193 | 10/1972 | Maier | 111/93 |

FOREIGN PATENT DOCUMENTS 7,909 of 1896 United Kingdom .................. 111/95

Primary Examiner—Edgar S. Burr
Assistant Examiner—Steven A. Bratlie
Attorney, Agent, or Firm—Bernard L. Kleinke

[57] ABSTRACT

A device for planting seeds into soil includes an elongated tubular housing having a concentrically-disposed axially-aligned elongated rigid member slidably mounted within the hollow interior of the housing. A tubular socket is connected to the end portion of the member for extending through an opening in the bottom end of the housing to dig into and retain a soil plug from the soil to be planted. A handle portion is connected to the opposite end of the member for extending through an opening in the top portion of the housing to enable the member to be moved axially relative to the housing toward its bottom end so that the socket can be forced into digging engagement with the soil and then the member retracted in the housing to withdraw the soil plug from its hole in the soil, whereby a seed can be dropped in the soil hole. An ejecting mechanism discharges the soil plug from the socket and into the soil hole for covering the seed therein. A seed delivery tube and a seed feeding mechanism are also provided for guiding the seeds into the hole for planting purposes.

7 Claims, 5 Drawing Figures

SEED PLANTING DEVICE WITH AUTOMATIC SEED COVERING

The present invention relates in general to a seed planting device, and it more particularly relates to a hand-held device which plants seeds into the soil and covers them over with soil.

Seed planting devices have been employed to plant seeds in the soil, and in this regard, reference may be made to the following U.S. Pat. Nos. 18,148; 43,139; 148,899; 294,636; 3,394,667 and 3,745,945. These patents disclose various different kinds of seed planting devices, some of which are manually operable devices. For example, U.S. Pat. No. 3,745,945 discloses a seed planting device which is in the form of an elongated tubular member which has a nozzle on the front end portion thereof for digging into the soil for discharging a seed therein. A pin carrying flange mounted on the nozzle is used to disturb the soil around the seed hole as the planter is withdrawn therefrom for backfilling purposes. However, such a device may not be entirely satisfactory for some applications in that the backfilling operation is somewhat awkward to perform and not entirely precise in operation. Also, the device shown in U.S. Pat. No. 3,745,945 is not adapted to feed one seed at a time into the hole formed in the soil, which single feeding operation is highly desirable since it is recommended that many vegetables and flower seeds are to be planted singly in a spaced-apart relationship to one another in a row. Also, it would be highly desirable to have a seed planting device which is relatively inexpensive to manufacture and highly efficient in operation.

Therefore, the principal object of the present invention is to provide a new and improved seed planting device, which can plant one or more seeds at a time in the soil with a manual operation and which readily and conveniently backfills the seed hole in a convenient operation.

Another object of the present invention is to provide such a new and improved seed planting device, which feeds the seeds to the seed holes individually in a convenient manner.

Briefly, the above and further objects of the present invention are realized by providing a device for planting seeds, which device includes an elongated tubular housing and an axially-aligned elongated rigid member slidably mounted within the hollow interior of the housing. A tubular socket connected to the end portion of the elongated member extends through the opening in the bottom end of the housing to dig into and retain a soil plug from the soil to be planted. A handle portion connected to the elongated member extends through the opening in the top end of the housing to enable the member to be moved axially relative to the housing toward its bottom end so that the socket can be forced into digging engagement with the soil and then the member retracted in the housing to withdraw the soil plug from its hole in the soil. As a result, a seed can be dropped into the soil hole, and an ejecting means discharges the soil plug from the socket and into the soil hole for covering the seed therein. Seeds are guided to the soil hole to enable them to fall under the force of gravity through a bottom opening in the housing and into the soil hole after the socket is retracted into the housing. A seed feeding mechanism is mounted on the outside of the housing and transfers seeds seriatum to the upper end of the seed delivery tube from a seed hopper storing a supply of seeds.

The above, and still further highly important objects and advantages of the invention will become apparent from the following detailed specification, appended claims, and attached drawings, wherein:

Figure 1:
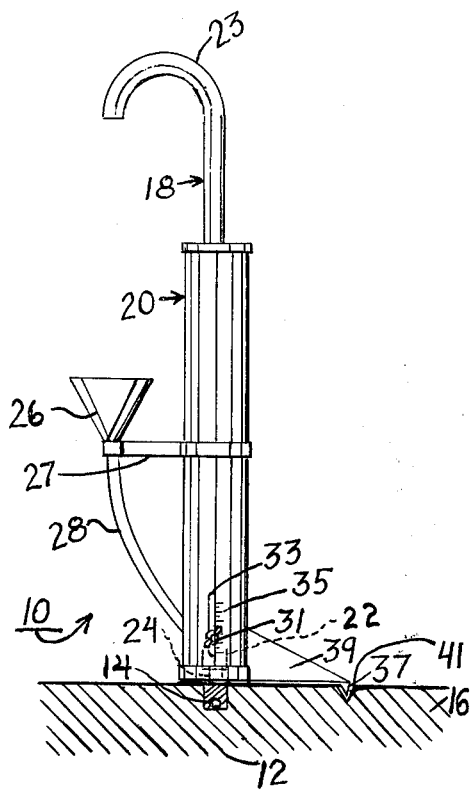
FIG. 1 is a front elevational view of the seed planting device which is constructed in accordance with the present invention.
Figure 2:
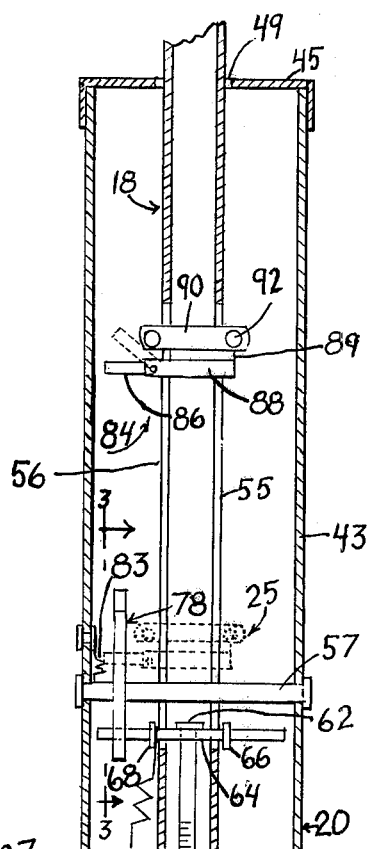
FIG. 2 is an enlarged fragmentary vertical cross-sectional view of the device of FIG. 1 showing it in a retracted position.

Referring now to the drawings, and more particularly to FIG. 1 thereof, there is shown a seed planting device 10, which is constructed in accordance with the present invention for planting a seed in a soil hole in ground 16 and then backfilling the hole with a soil plug 14. The device 10 generally comprises a tubular rigid member 18 extending through and slidably mounted within a tubular housing 20, the tubular member 18 terminating at its lower end in a socket 22 and terminating in its upper end with a handle 23. An ejector rod 24 is slidably mounted and axially disposed within the tubular member 18 for discharging the plug of soil 14 from the bottom distal end portion of the tubular member 18 forming the socket 22 as hereinafter described in greater detail. An ejecting mechanism generally indicated at 25 propels the ejector rod 24 axially out of the socket 22 to a position as shown in FIG. 1, which position is a position assumed by the device 10 immediately following the discharge of the soil plug 14 into the soil hole to cover the seed. A funnel 26 which may include a removable cap (not shown) is mounted by means of a bracket 27 externally of the housing 20 to guide a seed which is dropped therein via a rigid tube 28 which is connected at its upper end to the smaller end or outlet of the funnel 26 and at its lower end to the housing 20 as hereinafter described in greater detail to guide the seeds to the soil hole. As shown in FIG. 2 of the drawings, a pair of threaded rods, such as rod 30 extends transversely from the housing 20 and is held in position by wing nuts and washers 31 and 32 at opposite sides thereof, the rods extending through a pair of oppositely-disposed elongated slots 33 and 34 respectively to position adjustably an annular stop block 36 at the lower end portion of the housing 20 to enable the tubular member 18 to extend therethrough. By loosening the wing nuts the stop block 36 may be moved axially upwardly or downwardly to adjust the depth of penetration of the socket 22 into the ground 16. Graduated markings 35 on the outside of the housing 20 adjacent the elongated slot 33 is used to gauge the depth of the hole to be formed by the device 10. A scriber point 37 is disposed radially outwardly from the bottom end portion of the housing 20 and is mounted in place by means of a triangular support bracket 39 to form a notch 41 in the ground 16 when the socket 22 is thrust into the ground 16 to form a soil hole, whereby the notch 41 is an indicator used to enable the person doing the planting to provide a row of equally spaced-apart seed plants since the user can then plant the next seed at the notch 41.

In use, the user prepares the ejecting mechanism 25 by grasping the handle 23 in one hand and pulling the elongated member 18 axially upwardly to retract the socket 22 into the housing 20 for preparing for a seed planting operation. Thus, the device 10 initially assumes a position as shown in solid lines in FIG. 2 of the drawings. Thereafter, the user holds the device 10 by the handle 23 similar to a walking cane and rests the bottom end of the housing 20 on the ground 16 at the position where a seed is to be planted. The user then pushes down on the handle 23 to cause the member 18 to move axially relative to the housing 20 and downwardly, whereby the socket 22 digs into the soil or ground 16 to retain the soil plug 14 therewithin. The user then retracts the rod 18 partially toward its upper normal position, but before it reaches its normal position, the user drops a seed into the funnel 26 and the seed then falls under the force of gravity through the tube 28 and drops into the hole formed in the soil or ground 16. The seed can be dropped into the funnel when the rigid member first contacts the ground so that the seed will exit the tube 28 as the rigid member is retracting upwardly at ground level or slightly thereabove. The user then continues to move the handle 23 upwardly until the ejecting mechanism 25 propels the ejector rod 24 axially downwardly within the tubular elongated member 18. The ejector rod 24 then moves with sufficient force to discharge the soil plug 14 from the socket 22 and thus falls under the force of gravity into the soil hole over the seed 12 for backfilling purposes. The ejector rod 24 terminates its downward movement at a position where it extends slightly from the socket 22 as shown in solid lines in FIG. 2 of the drawings and in broken lines in FIG. 1 of the drawings.

It should be noted that when the socket 22 is pressed into engagement with the ground 16, the scriber point 35 also digs into the ground 16 to form the notch 41.

Figure 3:
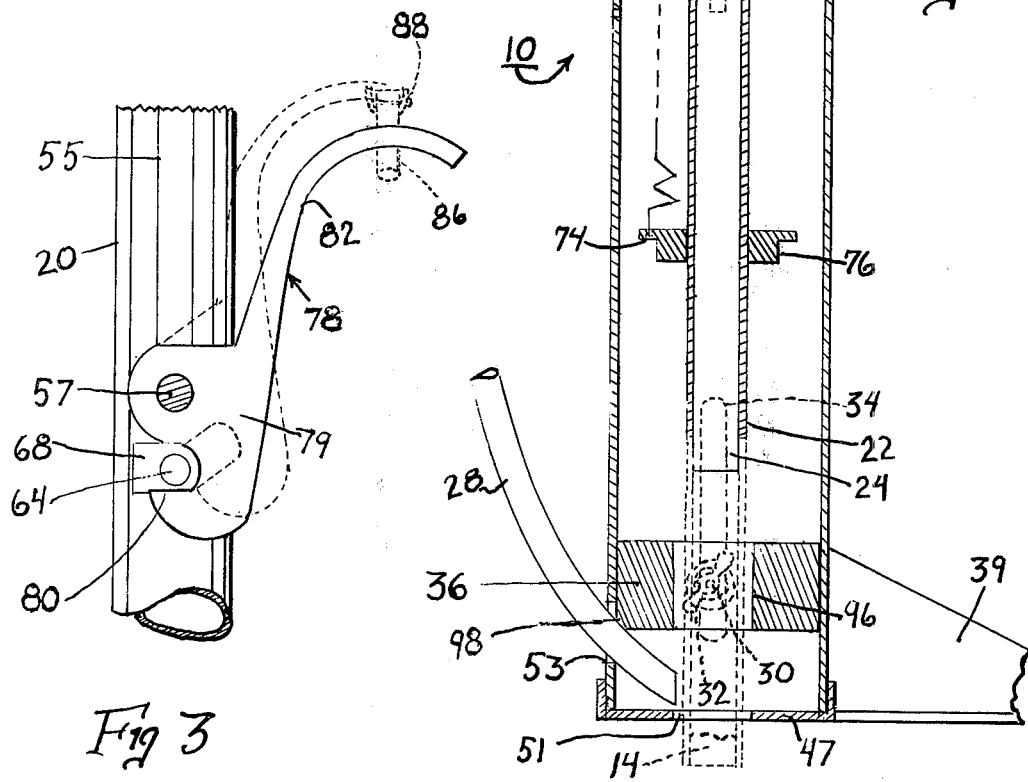
FIG. 3 is a cross-sectional view of a latching device of the ejecting mechanism of the seed planting device of FIG. 2 taken substantially along the line 3—3 thereof.

Considering now the housing 20 in greater detail with reference to FIGS. 2 and 3 of the drawings, the housing 20 includes a rigid tube 43 having end covers 45 and 47 at the top and bottom thereof, respectively. The covers 45 and 47 have respective central apertures or holes 49 and 51 which are axially aligned to permit the member 18 to extend therethrough.

An opening 53 at the bottom end portion of the housing 20 slightly above the bottom end cover 47 has the seed delivery tube 28 extending therethrough, which seed delivery tube 28 terminates at a position near the central hole 51 in the bottom cover plate 47, whereby the seed being guided by the tube 28 falls out of the lower end thereof and then through the central hole 51 and into the soil hole for planting purposes.

A pair of elongated slots 55 and 56 in opposite sides of the tubular member 18 receive a cross rod 57 which extends therethrough and is rotatably mounted at its opposite ends. The rod 57, amongst other things, serves to retain the tubular member 18 in a centrally-disposed axially-aligned position relative to the housing 20.

Considering now the ejector rod 24 in greater detail with reference to FIG. 2 of the drawings, the ejector rod 24 has a threaded rod 60 threaded into the upper rear end portion of the ejector rod 24 and extending through a hole in a cross rod 64 which is fixed to the head 62. The head 62 of the threaded rod 60 is fixed to the cross rod 64 by any suitable technique, such as by welding and then grinding off the welds. A pair of oppositely-disposed abutments in the form of enlarged flanges 66 and 68 are disposed on the cross rod 64 to limit its lateral movement. As a result, the cross rod 64 also serves to retain the tubular member 18 in its centrally-disposed axially-aligned position.

Considering now the ejecting mechanism 25 in greater detail with reference to FIGS. 2 and 3 of the drawings, the mechanism 25 generally includes a spring 72 which is stretched between the cross rod 64 and an annular flange 74 of a sleeve 76 surrounding and fixed to the tubular member 18. A latch 78 is fixed to and rotates with the rod 57 and as best seen in FIG. 3 of the drawings, is in the form of a bell crank 79 having a hook 80 at one side of the rod 57 and a curved cam arm 82 on the opposite side thereof, the hook 80 engaging the cross rod 64 to retain it releasably in position when the tubular member 18 moves downwardly toward the bottom end of the housing 20 and thereby stretches the spring 72. A return spring 83 biases the latch 78 angularly so that its hook 80 in its normal position engages and retains the cross rod 64.

A releasing mechanism generally indicated at 84 mounted on and carried by the elongated tubular member 18 is adapted to engage the curved cam arm 82 and pivot the bell crank 79 in a counter-clockwise direction as viewed in FIG. 3 to release the cross rod 64 to enable the ejector rod 24 to snap downwardly within the member 18 for discharging the soil plug 14 from the socket 22. The releasing mechanism 84 includes a pin 86 extending from and pivotally connected to a short channel member 88 which is fixed at its rear end to an upstanding flange 89, which in turn is fixed to a plate or strip 90 bolted by means of a U bolt 92 to the elongated tubular member 18. Thus, the pivotally mounted pin 86 extending from the upwardly opening channel member 88 serves as a knuckle joint since the path of travel of the pin 86 includes the curved cam arm 82, whereby as the elongated member 18 moves downwardly toward the bottom portion of the housing 20, the pin 86 engages the upper portion of the hook 82 and the pin 88 pivots in a clockwise direction as viewed in FIG. 2 of the drawings to enable the releasing mechanism 84 to continue downwardly past the curved cam arm 82. At the lower end of the path of travel of the tubular member 18, the pin 86 is disposed as shown in broken lines in FIG. 2 of the drawings slightly below the cam arm 82. Thereafter, when the user pulls up on the handle 23 to move the member 18 axially upwardly, the pin engages the underside of the curved cam arm 82 and causes the bell crank 74 to pivot in a counter-clockwise direction as viewed in FIG. 3 of the drawings. The pin 86 is prevented from pivoting much below a horizontal position as shown in solid lines in FIG. 2 of the drawings as a result of the channel member 88 which opens upwardly. The bell crank 79 continues to pivot in a counter-clockwise direction until the pin 86 slips off of the end of the curved cam arm 82, at which point the hook 80 of the bell crank 79 has pivoted to a position where it releases the cross rod 64.

In order to limit the downward movement of the elongated member 18, the stop block 36 has a centrally-disposed axially-aligned hole 96 for permitting the member 18 to extend therethrough and limits the movement of the sleeve 76. In this regard, when the user pushes down on the handle 23, the member 18 moves axially downwardly through the hole 96 in the stop block 36 until the bottom portion of the sleeve 76 engages the upper surface of the stop block 36. It should be noted that the position of the stop block 36 above the bottom end cover 47 determines the length of the path of travel of the member 18, whereby the distance that the socket 22 of the member 18 moves into the ground. As a result, the depth of the hole is determined by the position of the stop block 36 relative to the housing 20.

An angular opening 98 in the stop block 36 next to the opening 53 in the housing 20 enables the seed delivery tube 28 to extend to and terminate at a position close to the central aperture in the bottom plate 47.

It should be noted that at the beginning of the operation of the device 23 for planting a seed, the socket 22 is retracted within the housing 20 as indicated in solid lines in FIG. 2 of the drawings and the cross rod 64 is latched by the hook 80 of the bell crank 78. When the user pushes down on the handle 23 and the member 18 moves downwardly within the housing 20, the ejector rod 24 remains in the position as indicated in solid lines in FIG. 2 of the drawings so that only the member 18 with its socket 22 moves downwardly and thus the socket 22 is able to move into digging engagement with the ground 16 and the ejector rod 24 is not disposed within the socket 22.

Figure 4:
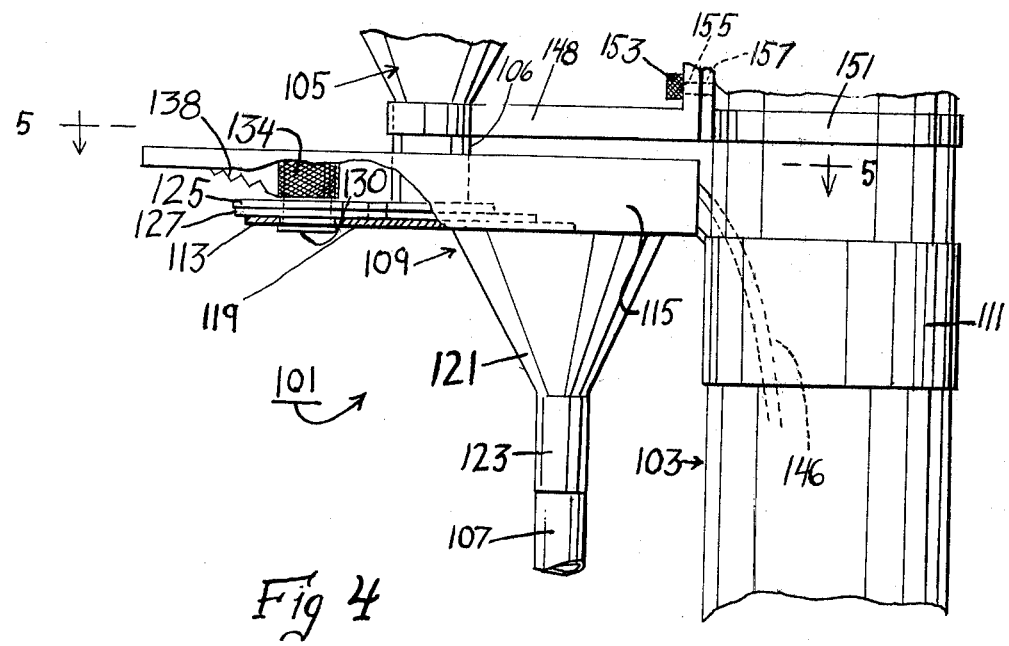
FIG. 4 is a fragmentary elevational view of a portion of another seed planting device having an automatic seed feeding mechanism which is constructed in accordance with the present invention.
Figure 5:
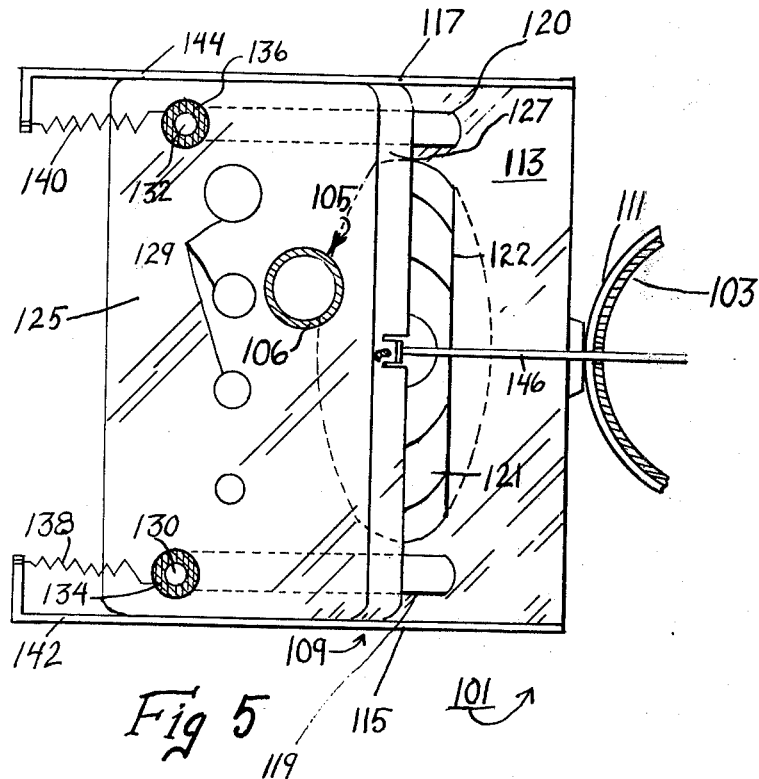
FIG. 5 is a cross-sectional view of the device of FIG. 4 taken substantially along the line 5—5 thereof.

Considering now the seed planting device 101 shown in FIGS. 4 and 5 of the drawings, the device 101 is similar to the device 10 shown in FIG. 1 of the drawings, except that an automatic seed feeding mechanism is attached to the device for feeding the seeds seriatum to the soil holes formed by the device 101. The device 101 includes a tubular housing 103 having all of the same internal mechanisms as the device 10 of FIG. 1 of the drawings (these mechanisms not being shown in FIGS. 4 and 5 of the drawings for sake of simplicity). A funnel 105 serving as a seed hopper for storing a supply of seeds to be planted is mounted externally of the housing 103. A slightly-flexible seed delivery tube 107 transports the seeds in a similar manner as the tube 28 of the device shown in FIG. 1 of the drawings. A collar 111 surrounds and is fixed to the housing 103 for supporting a horizontal plate 113 having a pair of parallel spaced-apart upstanding side flanges 115 and 117, the flanges extending away from the housing 103. A pair of elongated openings 119 and 120 extend through the horizontal plate 113 and extend in a direction parallel to the upstanding side flanges 115 and 117. A funnel-shaped guide 121 is fixed to the underside of the horizontal plate 113 over an elongated cross opening 122 extending in a direction perpendicular to the direction of the openings 119 and 120. A smaller opening or outlet 123 of the funnel member 121 is connected in communication with the upper end of the seed delivery tube 107.

In order to transport the seeds seriatum to the opening 122, a pair of stacked plates 125 and 127 positioned in overlying relationship with the horizontal plate 113 have a row of holes 129, which are of graduated different sizes to accommodate different sizes of seeds. Bolts 130 and 132 extend through aligned holes in the movable plates 125 and 127 and the respective elongated openings 119 and 120, whereby the pair of plates 125 and 127 can slide along the horizontal plate 113 toward and away from the cross opening 122 for delivering seeds thereto. A pair of cap nuts 134 and 136 are tightened onto the ends of the respective bolts 130 and 132. Return springs 138 and 140 are stretched between the L-shaped arms 142 and 144, respectively, and the bolts 130 and 132, respectively. A flexible line 146 is attached to an upstanding tab on the bottom plate 127 to move the two movable plates since the bottom end (not shown) of the line 146 is attached to the elongated member (not shown) which is similar to the elongated member 18 of the device 10 of FIG. 1. Therefore, as the elongated member (not shown) moves downwardly within the housing 103, the line 146 pulls the movable plates 125 and 127 along the horizontal plate 113 and when the elongated member is moved upwardly the return springs 138 and 140 return the movable plates 125 and 127 to their normal position as shown in FIGS. 4 and 5 of the drawings.

The distal end portion of the neck or outlet 106 of the seed hopper funnel 105 is mounted in close proximity to the upper surface of the upper movable plate 125 in alignment with one of the holes 129 so that when the movable plates move under the outlet 106, one of the seeds falls under the force of gravity into the desired hole. The seed then being disposed in the hole 129 is carried to the larger cross hole 122 to drop it into the funnel member 121. It should be noted that the overall thickness of the movable plates may be adjusted to accommodate various different sizes of seeds by adding or taking away from the movable plates. In this regard, similar other plates (not shown) may be added to the stack to increase the depth of the holes extending through the stack of plates. Also, the upper plate 125 may be eliminated in the case of very small size seeds.

A horizontally extending bracket 148 supports the seed hopper 105 in a position substantially parallel to the axis of the tubular housing 103, and the bracket 148 is connected to the housing 103 by means of a collar 151 which surrounds the housing and is fixed thereto. A cap screw 153 extends through a pair of aligned holes 155 and 157 in a pair of upstanding flanges of the bracket 148 and the collar 151 respectively. The slot 155 is elongated to serve as an adjustment slot, whereby the cap screw 153 may be loosened to permit the bracket 148 and the seed hopper 105 to be moved laterally into or out of the plane of the paper as shown in FIG. 4 of the drawings and the cap screw 153 can then be tightened in an adjusted position. As a result, the outlet 106 of the seed hopper 105 can be positioned in line with any one of the holes 129 to accommodate a given size of seed to be planted. Therefore, the seed hopper 105 then supplies seeds to the selected one of the holes 129 for conveying them to the elongated cross opening 122 in the horizontal plate 113.

While the present invention has been described in connection with particular embodiments thereof, it will be understood that those skilled in the art may make many changes and modifications without departing from the invention. For example, various different kinds of materials, such as rigid plastic materials, may be employed for the various different parts of the seed planting device of the present invention which is preferably entirely constructed of metal parts as disclosed herein. Accordingly, it is intended by the appended claims to cover all such changes and modifications as fall within the true spirit and scope of the invention.

What is claimed is:

1. A device for planting seeds, comprising:
    an elongated tubular housing having a hollow interior and having openings in the top and bottom ends of said housing;
    a concentrically-disposed axially-aligned elongated rigid member reciprocably mounted within the hollow interior of said housing;

a tubular socket connected to the end portion of said member for extending through the opening in the bottom end of said housing to dig into the soil to be planted and to withdraw a soil plug to leave a soil hole in the soil;

a handle portion connected to said member for extending through the opening in the top end of said housing to enable said member to be moved axially relative to said housing toward its bottom end so that said socket can be forced into digging engagement with the soil and then the member retracted in said housing whereby a seed can be dropped in the soil hole;

backfilling means for moving soil into the soil hole for covering the seed therein, said backfilling means including a slidably mounted ejector rod having a bottom end portion for moving into said socket for ejecting the soil plug from said socket into the soil hole to cover over the seed;

spring means stretched between said rod and said elongated rigid member for propelling said rod into said socket to discharge the soil plug therefrom;

means defining an elongated slot in said rigid member;

rod means connected fixedly to said ejector rod and extending transversely therefrom and through said slot terminating at its outer distal end within the interior of said housing;

a latch mounted within said housing for engaging releasably said rod means of said ejector rod as said rigid member moves toward the bottom end of said housing to stretch said spring means between said rigid member and said ejector rod, said latch having at its lower end portion hooking means for holding said rod means and thereby said ejector rod and having at its upper end portion camming means;

releasing means mounted on said rigid member and having a pivotally mounted pin means extending transversely from said rigid member to engage said camming means during the downward movement of said rigid member and to pivot rearwardly away from said camming member to enable said pin means to move forwardly to a position below said camming means, said releasing means further including rigid means for limiting the forward pivotal movement of said pin means so that, when said rigid member commences its rearward upper movement to carry said pin means from said position below said camming means, said pin means engages and moves said camming means to cause said latch to free said rod means during rearward movement thereof to permit said spring means to propel said ejector rod forwardly into said socket for discharging the soil plug from said socket into the soil hole;

seed delivery means having an outlet near said bottom opening for guiding seeds thereto to enable them to fall under the force of gravity through the bottom opening into the hole after said socket is retracted into said housing; and a seed hopper disposed rearwardly of said bottom end portion storing a supply of seeds having an outlet supplying a seed feeding mechanism.

2. A device according to claim 1, further including another opening in said housing near its bottom end portion, wherein said seed delivery means includes a tube mounted on the outside of said housing and extending through said another opening into the interior of said housing with the outlet end of said tube disposed near and above the bottom opening.

3. A device according to claim 2, said seed feeding mechanism mounted on the outside of said housing for transferring seeds seriatum to the upper end of said tube.

4. A device according to claim 3, wherein said seed feeding mechanism includes a stationary plate mounted on said housing and having an opening therein communicating with said tube, at least one movable plate being slidably mounted in overlying relationship on said stationary plate, at least one hole extending through said movable plate, said seed hopper having an outlet being disposed above the last-mentioned hole for supplying seeds thereto, means connecting said movable plate to said elongated member so that said movable plate slides relative to said stationary plate until the last-mentioned hole is aligned with the opening in said stationary plate when said elongated member moves axially.

5. A device according to claim 4, wherein said movable plate includes a plurality of other graduated sized holes for receiving and carrying different size seeds, means mounting adjustably said feeding mechanism on said housing for enabling said mechanism to be positionally adjusted laterally to align the outlet of said seed hopper with a desired hole in said movable plate, said opening in said stationary plate being elongated.

6. A device according to claim 5, further including a plurality of similar movable plates being fastened together releasably in stacked overlying relationship with their graduated holes disposed in vertical alignment with one another to enable the overall thickness of the movable plates to be adjustable for accommodating different size seeds by adding or eliminating one or more of the movable plates.

7. A device according to claim 1, wherein said hooking means includes a hook for engaging said rod means and said camming means includes a curved cam arm, said rigid means of said releasing means including a channel member opening upwardly and a pivotally mounted pin extending therefrom for engaging said cam arm, the forward distal end portion of said ejector rod being spaced axially rearwardly from said tubular socket during the digging operation.

* * * * *